No. 662,091.  
G. H. RICKE.  
COLLAPSIBLE CORE.  
(Application filed Jan. 26, 1900.)  
Patented Nov. 20, 1900.  
(No Model.)
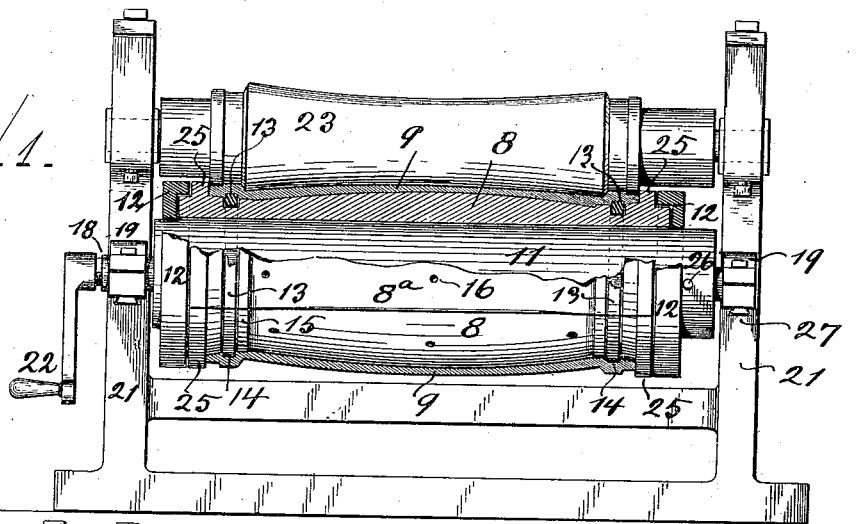
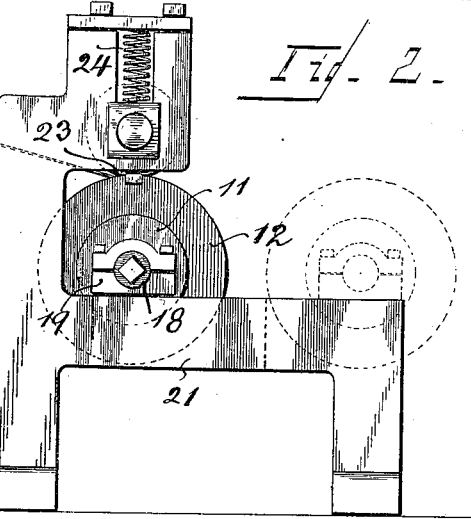
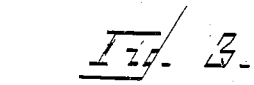
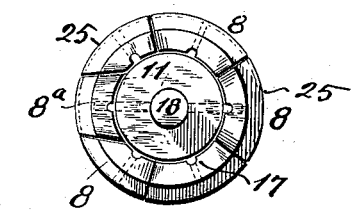
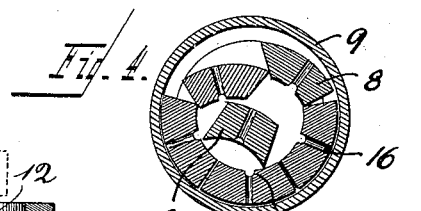
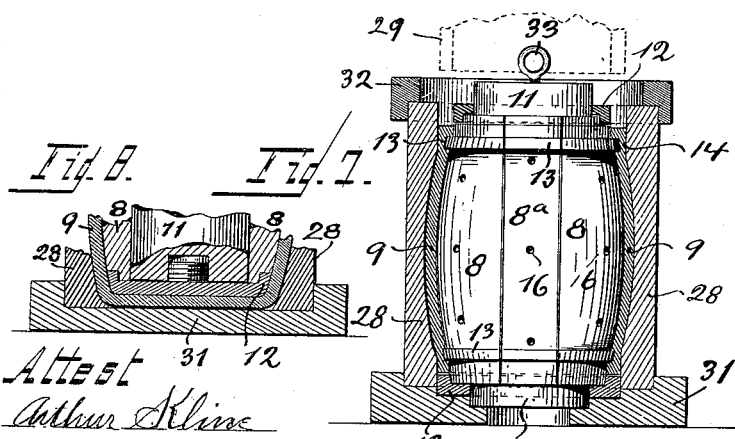
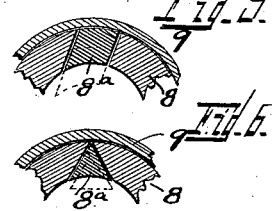
Attest  
Arthur Kline  
Bradford McGregor
Inventor:  
George H. Ricke  
by C. Spengel Atty.

United States Patent Office.

GEORGE H. RICKE, OF CINCINNATI, OHIO, ASSIGNOR TO CHARLES S. FURBER, OF COVINGTON, KENTUCKY.

COLLAPSIBLE CORE.

SPECIFICATION forming part of Letters Patent No. 662,091, dated November 20, 1900.

Application filed January 26, 1900. Serial No. 2,829. (No model.)

*To all whom it may concern:*

Be it known that I, GEORGE H. RICKE, a citizen of the United States, and a resident of Cincinnati, Hamilton county, State of Ohio, have invented a certain new and useful Collapsible Core; and I do declare that the following is a description thereof sufficiently clear, full, and exact to enable others skilled in the art to which it appertains to make and use the same, attention being called to the accompanying drawings, with the reference-numerals marked thereon, which form also a part of this specification.

This invention relates to molds for forming plastic material into hollow shapes like spheroids, truncated spheroids, barrel shapes, or any other shape substantially cylindrical, but of a diameter which is not alike at all points of the length of the molded article.

The shell of a barrel—that is, one without heads and of larger diameter between its ends than at these latter—represents the shape I have here principally in view; and the more particular object of my invention is to produce means aiding in the manufacture of such shells, the intention being to provide the shells afterward with heads and to use the completed vessels for packing, shipping, storing, and all other similar purposes for which wooden barrels, kegs, &c., are now used. As a material any one suitable may be used and which has the characteristics of hardening from a plastic state to one which is air and water tight and sufficiently strong and durable to stand the wear which such vessels are subject to. The difficulty in molding such shapes is the ability to remove the core after the article is molded, and the main object of my invention is therefore to provide a core constructed in a certain manner to permit such removal. This object is attained by the construction which my invention provides and as described in the annexed specification and pointed out in the claims following it, the device being also illustrated in the accompanying drawings, in which—

Figure 1 is a front view of a device embodying my invention, parts being also shown in longitudinal section. Fig. 2 is an end view of Fig. 1. Fig. 3 is an end view of the core detached. Fig. 4 is a central cross-section of the same, partly collapsed. Figs. 5 and 6 in parts of views similar to Fig. 4 show modified constructions. Fig. 7 is a view similar to Fig. 1, showing my invention used in a different manner; and Fig. 8 is a view similar to the lower part of the preceding figure, showing this last form of my invention used again in a different manner.

In order to permit withdrawal of the core, I divide the same lengthwise into sections arranged and constructed as follows:

The outer part of the core I divide into a number of segmental sections 8, the outer convex surface of each of which forms one of the component parts of the outer surface of the core, so that when these sections are all in place the outer surface of the core is also complete and forms the molding-surface against which the plastic material 9 is placed, thereby determining the interior shape of the resulting article. The space inside of these segmental core-sections I fill out with a solid core-section 11 of equal thickness all through and fitting closely against the inner surfaces of these segmental core-sections, so that when in place it holds these latter in their proper relative positions. After the shell 9 is molded the inner core-section is separated from the outer ones, thereby removing the interior support which it furnished while in place for the purpose of holding the outer or segmental core-sections outwardly and in their proper positions. For breaking the connection of the segmental sections it becomes necessary to provide at least one which on its inside is not wider than on its outside and the edges of which, or at least one of them, is cut on a line otherwise than radial. Figs. 3, 5 and 6 show each such a section, (indicated by 8ᵃ,) which permits its withdrawal inwardly from between the locked line of the other sections. It is now clear that as soon as this particular first section is removed the remainder of them collapse, as shown in Fig. 4, and may be withdrawn piece by piece through one of the open ends of the mold. When ready for reuse, these sections are simply set up against the interior core 11, where they are held in position by locking-rings 12, placed over their ends. The outer convex surface presented by these segmental core-sections so assembled is of course shaped to suit the interior shape of the article to be molded and may contain any special shapes or formations in the way of projections or depressions which it is intended this latter should have. Thus, for instance, projections 13 may be provided near each end of these sections, forming in the molded article a groove 14, constituting the croze which is to receive the edge of the heads. An additional projection 15 is shown in Fig. 1, producing a straight shoulder in the molded shell. The depth of this croze may be varied by adjusting the extent of the projection 13, and for which purpose this latter may be formed by separate ring-sections removably attached, so as to permit their interchange for such, presenting more, less, or no projection. Outlets to permit ventilation or drainage, accordingly whether heat or moisture, or both, are evolved during the process of molding, may be provided for by holes 16 in the core-section and longitudinal grooves or channels 17, which may be either in the outer surface of the inner core-section 11 or in the inner surface of the segmental sections, as shown.

Having described the inner core-section 11 as solid, I do not wish to be understood as meaning that the same should be of solid material in its entirety, but merely have reference to the outside thereof, which should present a compact surface, while otherwise the core may be hollow. The particular manner of use of this core depends on the kind of material to be molded. In Figs. 1 and 2 I have shown it as being used in connection with paper-pulp which is in sheet form and of which successive layers are wound around the core until the desired thickness of shell 9 is obtained. The core is rotated for such purpose, its inner section 11, serving as a mandrel, being provided with journals 18, mounted in boxes 19 and supported on a frame 21. The power for such rotation may be applied by machinery or by hand applied through the medium of a crank 22. The various layers of the pulp as they successively arrive upon the core are continually compacted by the action of a pressure-roller 23, shaped on its face to conform to the shape which the outside of the shell is to receive and held down by springs 24. The ends of the shell are determined by annular flanges 25, on the core between which the ends of the forming-face of pressure-roller 23 fit. When using my core in this position, it becomes necessary to confine the locking-rings 12 in their position on the inner core 11 during the molding process. For such purpose one of these rings—the one on the left end in Fig. 1—may be permanently secured in any suitable manner, while the other one is removably held by any means—as, for instance, by a pin 26.

For withdrawing the core to obtain the molded shell the whole device as it appears in Figs. 1 and 2 is pulled forward on frame 21, so as to occupy a position as shown in dotted lines in Fig. 2. To guide the device during this sliding movement, I hold it to its position by a dovetailed connection, as shown at 27, on the under side of the boxes. One part of the frame upon which these boxes rest does not project out as far as the other, (see dotted line in Fig. 2,) so that when the device has arrived in the position shown in dotted lines in this figure the box on that side may be removed. Pin 26 and locking-ring 12 immediately behind it are next removed, after which the outer part of the core—that is, the segmental sections yet in position within the molded shell and surrounded by the same—are pulled off as a whole from the inner section 11 of the core. The parts in this condition as they appear now are illustrated in Fig. 3. As soon as these segmental sections have moved off and cleared the inner section 11 they lose the support of this latter and of necessity collapse, as shown in Fig. 4, after which they may be readily withdrawn, one after the other, from the open ends of the molded shell.

In Fig. 7 I have shown my core used in connection with a material approaching a state more liquid and incapable of being handled in form of sheets. It might be paper or wood pulp or a similar substance. In this case I require an outer mold 28, which is divided in two or more sections to permit separation and spaced with reference to the core, so as to produce the thickness which the wall of the shell is required to have. In this case I prefer to set the mold up endwise, pouring the substance in through the open upper end. When necessary, pressure may be applied to compress the substance inside of the mold, which may be done by means of an annular plunger 29, shown in dotted lines and entering from above. These outer sections of the mold are held together during the molding operation by means of a recessed base 31 below and by a ring 32 above. Base 31 is further recessed to receive the lower locking-ring 12 and the lower end of the inner core-section 11. The manipulation for obtaining the molded shell is somewhat different in this case, inasmuch as the inner core-section 11 is pulled out from between the segmental sections instead of pulling these latter off first, as described before. An eye 33 is provided, whereby a hold is taken of section 11 for such purpose.

In Fig. 8 I have shown my invention used in a manner which enables me to cast one of the heads—the lower one—solid with the shell. The construction in this case differs only slightly in this way that the lower locking-ring 12 must be in the shape of a disk and detachably connected to the inner core-section 11, which must be detached therefrom before it can be pulled out.

Having described my invention, I claim as new—

1. A composite, collapsible core consisting of an inner core-section 11 of equal thickness throughout its entire length, independent segmental sections 8 curved outwardly between their ends and fitted loosely without connection against and around this inner core-section 11 in a manner that they join each other edgewise and present when so assembled an unbroken continuous, cylindrically-convex surface in which position they are so supported and held outwardly by inner section 11, one of these segmental sections designated by 8ª having its edges so shaped as to permit its independent withdrawal inwardly into and removal from the space which is left after the outer segmental sections 8 and the inner section 11 have been separated from each other, special formations on the outside of these segmental sections and projections near their ends, completing when these sections are assembled the former certain special shapes which are reproduced in the interior of the article to be molded and the latter an outwardly-projecting annular flange 25 which determines the end of the shell and locking-rings engaging the ends of the segmental sections for the purpose of holding them in position on the inner core being detachably connected, so that upon their removal, the inner core becomes separable from the segmental sections and these latter become also separable from each other.

2. A composite, collapsible core consisting of an inner core-section 11 of equal thickness throughout its entire length, independent segmental sections 8 curved outwardly between their ends and fitted loosely without connection against and around this inner core-section 11 in a manner that they join each other edgewise and present when so assembled an unbroken continuous, cylindrically-convex surface in which position they are so supported and held outwardly by inner section 11, one of these segmental sections designated by 8ª having its edges so shaped as to permit its independent withdrawal inwardly into and removal from the space which is left after the outer segmental sections 8 and the inner section 11 have been separated from each other, grooves near each end of the outside of these segmental sections, segmental rings wider than the depth of these grooves fitted thereto and detachably secured therein, forming when the segmental sections are assembled, a continuous annular projection on the outside of the core which produces an interior groove in the molded article and locking-rings engaging the ends of the segmental sections for the purpose of holding them in position on the inner core being detachably connected, so that upon their removal, the inner core becomes separable from the segmental sections and these latter become also separable from each other.

3. A composite, collapsible core consisting of an inner core-section 11 of equal thickness throughout its entire length having journals projecting from each of its ends, independent segmental sections 8 curved outwardly between their ends and fitted loosely without connection against and around this inner core-section 11 in a manner that they join each other edgewise and present when so assembled an unbroken continuous, cylindrically-convex surface in which position they are so supported and held outwardly by inner section 11, one of these segmental sections designated by 8ª having its edges so shaped as to permit its independent withdrawal inwardly into and removal from the space which is left after the outer segmental sections 8 and the inner section 11 have been separated from each other, and locking-rings engaging the ends of the segmental sections for the purpose of holding them in position on the inner core, being detachably connected, so that upon their removal, the inner core becomes separable from the segmental sections and these latter become also separable from each other.

In testimony whereof I hereunto affix my signature in the presence of two witnesses.

GEORGE H. RICKE.

Witnesses:
CHAS. S. FURBER,
C. SPENGEL.